United States Patent
Taylor

[11] 3,733,792
[45] May 22, 1973

[54] FILTERS

[75] Inventor: Roland Taylor, Egremont, England

[73] Assignee: United Kingdom Atomic Energy Authority, London, England

[22] Filed: Apr. 9, 1970

[21] Appl. No.: 27,034

[30] Foreign Application Priority Data

Apr. 17, 1969 Great Britain......................19,786/69

[52] U.S. Cl. ..........................55/488, 55/520, 55/525, 55/DIG. 25
[51] Int. Cl. .............................................B01d 25/04
[58] Field of Search................55/185, 186, 485–487, 55/488, 498, 520, 525, 526, DIG. 25; 210/494, 497

[56] References Cited

UNITED STATES PATENTS

| | | | |
|---|---|---|---|
| 1,676,191 | 7/1928 | Jordahl | 55/526 |
| 2,059,017 | 10/1936 | Nickle | 55/485 |
| 2,327,184 | 8/1943 | Goodloe | 55/487 |
| 2,514,623 | 7/1950 | Brown | 55/487 |
| 2,639,779 | 5/1953 | Glanzer | 55/187 |
| 2,792,075 | 5/1957 | McBride et al. | 55/525 |
| 2,925,878 | 2/1960 | Spann | 55/185 |

*Primary Examiner*—Bernard Nozick
*Attorney*—Larson and Taylor

[57] ABSTRACT

A filter for a liquid aerosol comprising knitted wire mesh with a surface of a material not wetted by the aerosol, arranged in layers and rolled into a cylindrical spiral, a minor proportion of the layers of wire mesh being of coarser wire than the remainder of the layers and being disposed between layers of the remainder. The invention finds application in the filtering of blanket gas in sodium-cooled nuclear reactors.

2 Claims, 2 Drawing Figures

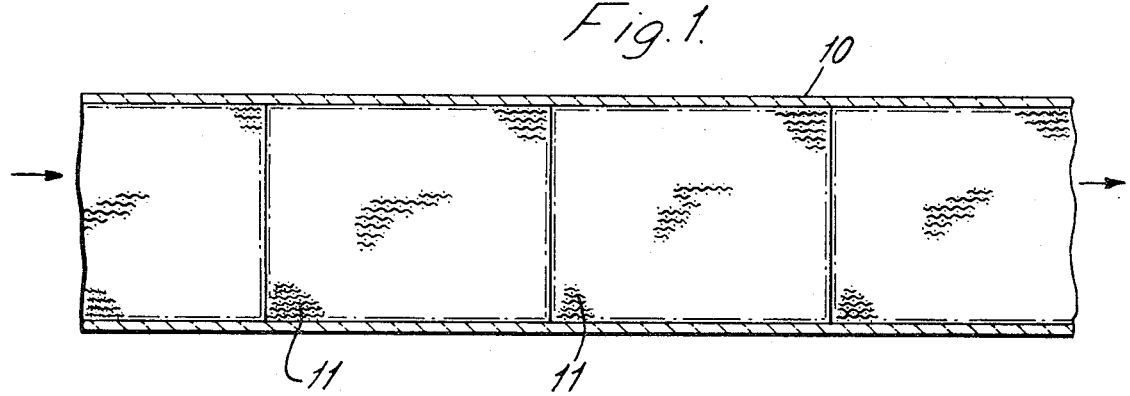
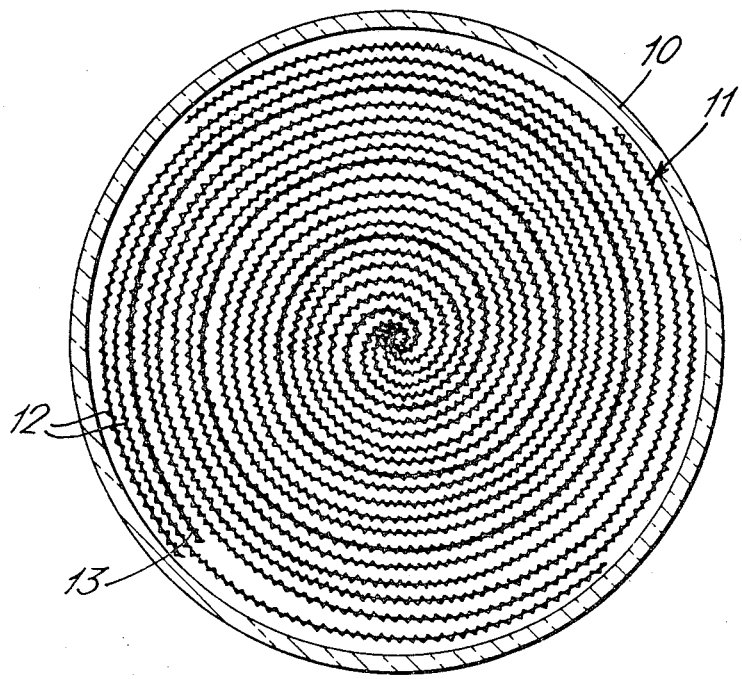

FILTERS

BACKGROUND OF THE INVENTION

This invention relates to filters and is primarily concerned with filters for liquid aerosols. The invention finds application in the filtering of the blanket gas used in sodium cooled nuclear reactors above the reactor core. This gas comes into contact with hot sodium and on cooling this is liable to form a fine (sub-micron) aerosol.

SUMMARY OF THE INVENTION

According to the invention a filter for a liquid aerosol comprises knitted wire mesh, arranged in layers and rolled into a cylindrical spiral, a minor proportion of the layers of wire mesh being of coarser wire than the remainder of the layers and being disposed between layers of the remainder.

The aerosol is passed through the filter in the direction of the axis of the cylinder formed by the layers of knitted wire mesh. It is considered that the liquid aerosol collects on the wire by diffusion, impaction and interception, that the drag of gas flow through the filter forces these aerosol droplets along the wire until they coalesce, and that the open structure of a filter in accordance with the invention allows drainage of coalesced droplets even from fine wire providing wetting of the wire does not occur. The wire surface therefore is of a material not wetted by the aerosol.

The coarser wire layers serve to facilitate drainage without providing free paths for the aerosol avoiding filtration. The liquid drops select the easiest flow passages to the outer faces of the filter and clogging does not generally occur even though the liquid derived from the aerosol penetrates the filter. Suitable provisions are made for disposal of the liquid draining from the filter.

DESCRIPTION OF THE DRAWING

The invention will now be described by way of example only with reference to the accompanying drawings wherein FIG. 1 is a side view and FIG. 2 is an end view. The drawings are diagrammatic only.

DESCRIPTION OF PREFERRED EMBODIMENT

In FIG. 1 of the drawings is shown a stainless steel tube 10 in section housing a series of filters 11. Each filter is made up of layers of stainless steel knitted wire mesh having 12 stitches to the inch, as shown in FIG. 2 on a larger scale than FIG. 1. A layer 12 of coarse wire mesh ($125\mu$ diameter) is disposed between four layers 13 of fine wire mesh ($45\mu$ diameter). The layers are rolled up to form a cylindrical spiral, typically 3 inches in diameter and 4 inches in length. The filters are arranged end to end in the tube 10. For use in filtering argon blanket gas containing sodium from above the core of a sodium-cooled nuclear reactor the filter is inclined at an angle to the horizontal and maintained at a temperature at which sodium does not wet the stainless steel wire. Gas containing sodium is fed downwardly through the filter at a face velocity of 10–12 ft/min. Passages in the filter become full of liquid sodium and drops of sodium drain from the rear face of the filter. At lower flows drainage may be from the front face.

I claim:

1. A filter apparatus for liquid aerosol comprising a tubular housing having an inlet and an outlet, a substantially solid cylindrical filter positioned within said housing between said inlet and outlet and contacting the walls thereof, said filter comprising a knitted wire mesh rolled into a cylindrical spiral, said cylindrical spiral being defined by coarse and fine layers, said coarse layers constituting a minor proportion of said cylindrical spiral and each of said coarse layers alternating with a plurality of the fine layers.

2. A filter apparatus as claimed in claim 1 wherein the knitted wire mesh has a stainless steel surface.

* * * * *